United States Patent
Choi et al.

(10) Patent No.: US 11,563,606 B2
(45) Date of Patent: Jan. 24, 2023

(54) METHOD FOR DETECTING ON-OFF KEYING SYMBOLS FOR WIRELESS BODY AREA NETWORKS WITH SUPERVISED LEARNING AND SYSTEM THEREFOR

(71) Applicant: Korea Advanced Institute of Science and Technology, Daejeon (KR)

(72) Inventors: Junil Choi, Daejeon (KR); Jihoon Cha, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 17/529,362

(22) Filed: Nov. 18, 2021

(65) Prior Publication Data

US 2022/0353116 A1 Nov. 3, 2022

(30) Foreign Application Priority Data

Apr. 30, 2021 (KR) .................. 10-2021-0056630

(51) Int. Cl.
*H04L 27/04* (2006.01)
*H04L 27/26* (2006.01)

(52) U.S. Cl.
CPC .......... *H04L 27/04* (2013.01); *H04L 27/2602* (2013.01)

(58) Field of Classification Search
None
See application file for complete search history.

(56) References Cited

U.S. PATENT DOCUMENTS

| | | | | |
|---|---|---|---|---|
| 10,265,017 | B1* | 4/2019 | Myslinski | A61B 5/07 |
| 10,396,849 | B1* | 8/2019 | Badawy | H04B 1/71637 |
| 2007/0299480 | A1* | 12/2007 | Hill | A61N 1/37288 |
| | | | | 607/60 |
| 2011/0149791 | A1* | 6/2011 | Wang | H04K 3/226 |
| | | | | 370/252 |
| 2014/0171002 | A1* | 6/2014 | Park | H04L 25/067 |
| | | | | 455/226.1 |
| 2016/0269054 | A1* | 9/2016 | Kim | H04B 1/04 |
| 2016/0296115 | A1* | 10/2016 | Wang | G16H 40/63 |

* cited by examiner

*Primary Examiner* — Khanh C Tran
(74) *Attorney, Agent, or Firm* — Cahn & Samuels, LLP

(57) ABSTRACT

A method for detecting on-off keying symbols includes receiving, by each of distributed Rx nodes, a pilot signal for a pilot symbol transmitted from a transmitter, the distributed Rx nodes constituting the wireless body area communication network, obtaining, by each of the Rx nodes, a reference value using the received pilot signal, transmitting, by each of the Rx nodes, received data signal to a fusion center when the data signal for the on-off keying symbol transmitted from the transmitter is received by each of the Rx nodes, calculating, by the fusion center, a weight of the on-off keying symbol for each of the Rx nodes using the reference value obtained from each of the Rx nodes and the received data signal, and detecting, by the fusion center, the on-off keying symbol transmitted from the transmitter using the weight of the on-off keying symbol calculated for each of the Rx nodes.

12 Claims, 11 Drawing Sheets

FIG. 3

| | Distribution model ($\rho \geq 0$) | CV |
|---|---|---|
| $f_{|h_1[n]|^2}(\rho)$ | Burr([$4.71*10^{-7}, 2.43, 5.61$]) | 0.4861 |
| $f_{|h_1[n]|^2}(\rho)$ | Burr([$9.32*10^{-7}, 3.88*10^1, 5.52\ 10^{-1}$]) | 0.0638 |
| $f_{|h_2[n]|^2}(\rho)$ | Burr([$2.29*10^{-8}, 1.21*10^1, 5.07\ 10^{-1}$]) | 0.2390 |
| $f_{|h_3[n]|^2}(\rho)$ | Burr([$5.63*10^{-6}, 2.40*10^1, 3.97\ 10^{-1}$]) | 0.1363 |
| $f_{|h_4[n]|^2}(\rho)$ | Weibull([$1.76*10^{-6}, 3.88$]) | 0.2884 |
| $f_{|h_5[n]|^2}(\rho)$ | Burr([$3.83*10^{-7}, 7.06, 1.26$]) | 0.2392 |
| $f_{|h_6[n]|^2}(\rho)$ | Burr([$1.31*10^{-6}, 5.25, 1.47$]) | 0.3055 |
| $f_{|h_7[n]|^2}(\rho)$ | Weibull([$1.01*10^{-6}, 4.05$]) | 0.2774 |
| $f_{|h_8[n]|^2}(\rho)$ | Burr([$7.76*10^{-6}, 9.71, 7.87$]) | 0.1295 |

METHOD FOR DETECTING ON-OFF KEYING SYMBOLS FOR WIRELESS BODY AREA NETWORKS WITH SUPERVISED LEARNING AND SYSTEM THEREFOR

CROSS-REFERENCE TO RELATED APPLICATIONS

A claim for priority under 35 U.S.C. § 119 is made to Korean Patent Application No. 10-2021-0056630 filed on Apr. 30, 2021, in the Korean Intellectual Property Office, the entire contents of which are hereby incorporated by reference.

BACKGROUND

The inventive concept relates to a technique for detecting on-off keying symbols for a wireless body area communication network, and more specifically, to a method for detecting on-off keying symbols for a wireless body area communication network, which detects on-off keying (OOK) symbols transmitted through a rapidly-changing channel in a noncoherence wireless body area communication network system using supervised learning and a system therefor.

Standardization of wireless body area networks (WBANs) that defines wireless communication around and inside the human body enables performance improvement such as precision measurement of medical devices, as well as development of various non-medical devices or sensors that respond to physical activity. Signal propagation in the wireless body area communication network complies with a channel model different from that defined in the existing air communication. Since the number of factors defining these channels is very large and the factors are intricately linked with each other, there are few studies to statistically model the channels.

In particular, since the channel characteristics of the wireless body area communication network vary from person to person and rapidly change due to body movements and body conditions, it makes channel modeling more difficult. There is a need for a noncoherence system to stably perform communication in the human body. Previously, there have been studies using only the energy information of received signals under the assumption of a noncoherence system, but most of them use statistical channel information at an Rx end, so it cannot be applied to a wireless body area communication network environment where even such information is difficult to obtain.

In general wireless communications, a receiver detects a transmitted signal in a decision region defined using statistical information of signals, which is basically the same as solving a classification issue. Common classification issues can be solved by machine learning using a large number of samples and have already been used in several studies on air communication environments. Since all of the studies have used channels with long coherence times, the environment to be considered is different from that of the wireless body area communication network with rapidly-changing channels.

The distributed reception technique is one of widely used reception diversity techniques, in which a plurality of Rx (Receive) nodes are positioned to be geographically separated from each other and a fusion center collects information on which a simple signal processing process has been performed. Although the distributed reception technique has the advantage of being able to have communication performance similar to the communication performance of a centralized system only with low cost and low power consumption, it has not been considered in a noncoherence wireless body area communication network environment so far.

SUMMARY

Embodiments of the inventive concept provide a method for detecting on-off keying symbols for a wireless body area communication network, which detects on-off keying (OOK) symbols transmitted through a rapidly-changing channel in a noncoherence wireless body area communication network system using supervised learning and a system therefor.

According to an embodiment, a method for detecting an on-off keying symbol in a wireless body area communication network includes receiving, by each of distributed Rx nodes, a pilot signal for a pilot symbol transmitted from a transmitter, the Rx nodes constituting the wireless body area communication network, obtaining, by each of the Rx nodes, a reference value using the received pilot signal, transmitting, by each of the Rx nodes, a data signal for the on-off keying symbol transmitted from the transmitter to a fusion center when the data signal is received by each of the Rx nodes, calculating, by the fusion center, a weight of the on-off keying symbol for each of the Rx nodes using the reference value obtained from each of the Rx nodes and the received data signal, and detecting, by the fusion center, the on-off keying symbol transmitted from the transmitter using the weight of the on-off keying symbol calculated for each of the Rx nodes.

The obtaining of the reference value may include obtaining, by each of the Rx nodes, the reference value using a sample average or probability of 0 and 1 of the received pilot signal as a statistical value.

The detecting of the on-off keying symbol may include summing a weight of on-off keying symbols of 1 and a weight of on-off keying symbols of 0, calculated for each of the Rx nodes, and detecting the on-off keying symbol transmitted from the transmitter based on a difference between the summed weight of the on-off keying symbols of 1 and the summed weight of the on-off keying symbols of 0.

The obtaining of the reference value may include calculating, by each of the Rx nodes, a threshold amplitude, comparing the calculated threshold amplitude with a magnitude of the received pilot signal to detect pilot symbols for 0 and 1, and obtaining an empirical conditional probability for detection of the pilot symbols for 0 and 1 as the reference value, and the calculating of the weight of the on-off keying symbol may include calculating a weight of the on-off keying symbol for each of the Rx nodes using detected on-off keying symbols for 0 and 1 through comparison between the empirical conditional probability for detection of the pilot symbols for 0 and 1 and the calculated threshold amplitude, when each of the Rx nodes detects on-off keying symbols for 0 and 1 by comparing the calculated threshold amplitude with a magnitude of the received data signal.

The obtaining of the reference value may include obtaining, each of the Rx nodes, a sample average for 0 and 1 of the received pilot signal, as the reference value, and the calculating of the weight of the on-off keying symbol may include calculating a weight of the on-off keying symbol for each of the Rx nodes by using a difference between the reference value for the pilot symbol for 0 and 1 obtained by each of the Rx nodes and the magnitude of the received data signal.

The obtaining of the reference value may include calculating, by each of the Rx nodes, a threshold amplitude, comparing the calculated threshold amplitude with a magnitude of the received pilot signal to detect pilot symbols for 0 and 1, calculating a sample average for 0 and 1 of the received pilot signal, and obtaining both the calculated sample average and an empirical conditional probability for detection of a pilot symbol for 0 and 1 as the reference value, and the calculating of the weight of the on-off keying symbol may include calculating a weight of the on-off keying symbol for each of the Rx nodes using detected on-off keying symbols for 0 and 1 through comparison among the empirical conditional probability for detection of the pilot symbols for 0 and 1, the calculated sample average and the calculated threshold amplitude, when each of the Rx nodes detects on-off keying symbols for 0 and 1 by comparing the calculated threshold amplitude with a magnitude of the received data signal.

According to an embodiment, a system for detecting an on-off keying symbol in a wireless body area communication network includes distributed Rx nodes and a fusion center, wherein each of the Rx nodes may receive a pilot signal for a pilot symbol transmitted from a transmitter, obtain a reference value using the received pilot signal, transmit the received data signal to a fusion center when the data signal for the on-off keying symbol transmitted from the transmitter is received by each of the Rx nodes, and the fusion center may calculate a weight of the on-off keying symbol for each of the Rx nodes using the reference value obtained from each of the Rx nodes and the received data signal and detect the on-off keying symbol transmitted from the transmitter using the weight of the on-off keying symbol calculated for each of the Rx nodes.

Each of the Rx nodes may obtain the reference value using a sample average or probability of 0 and 1 of the received pilot signal as a statistical value.

The fusion center may sum a weight of on-off keying symbols of 1 and a weight of on-off keying symbols of 0, calculated for each of the Rx nodes, and detect the on-off keying symbol transmitted from the transmitter based on a difference between the summed weight of the on-off keying symbols of 1 and the summed weight of the on-off keying symbols of 0.

Each of the Rx nodes may calculate a threshold amplitude, compare the calculated threshold amplitude with a magnitude of the received pilot signal to detect pilot symbols for 0 and 1, and obtain an empirical conditional probability for detection of the pilot symbols for 0 and 1 as the reference value, and the fusion center may calculate a weight of the on-off keying symbol for each of the Rx nodes using detected on-off keying symbols for 0 and 1 through comparison between the empirical conditional probability for detection of the pilot symbols for 0 and 1 and the calculated threshold amplitude, when each of the Rx nodes detects on-off keying symbols for 0 and 1 by comparing the calculated threshold amplitude with a magnitude of the received data signal.

Each of the Rx nodes may obtain a sample average for 0 and 1 of the received pilot signal as the reference value, and the fusion center may calculate a weight of the on-off keying symbol for each of the Rx nodes by using a difference between the obtained reference value for the pilot symbol for 0 and 1 and the magnitude of the received data signal.

Each of the Rx nodes may calculate a threshold amplitude, comparing the calculated threshold amplitude with a magnitude of the received pilot signal to detect pilot symbols for 0 and 1, calculate a sample average for 0 and 1 of the received pilot signal, and obtain both the calculated sample average and an empirical conditional probability for detection of a pilot symbol for 0 and 1 as the reference value, and wherein the fusion center may calculate a weight of the on-off keying symbol for each of the Rx nodes using detected on-off keying symbols for 0 and 1 through comparison among the empirical conditional probability for detection of the pilot symbols for 0 and 1, the calculated sample average and the calculated threshold amplitude, when each of the Rx nodes detects on-off keying symbols for 0 and 1 by comparing the calculated threshold amplitude with a magnitude of the received data signal.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 3 is a diagram illustrating an example of a probability distribution of the square of a channel gain of a wireless body area communication network.

DETAILED DESCRIPTION

Figure 1:
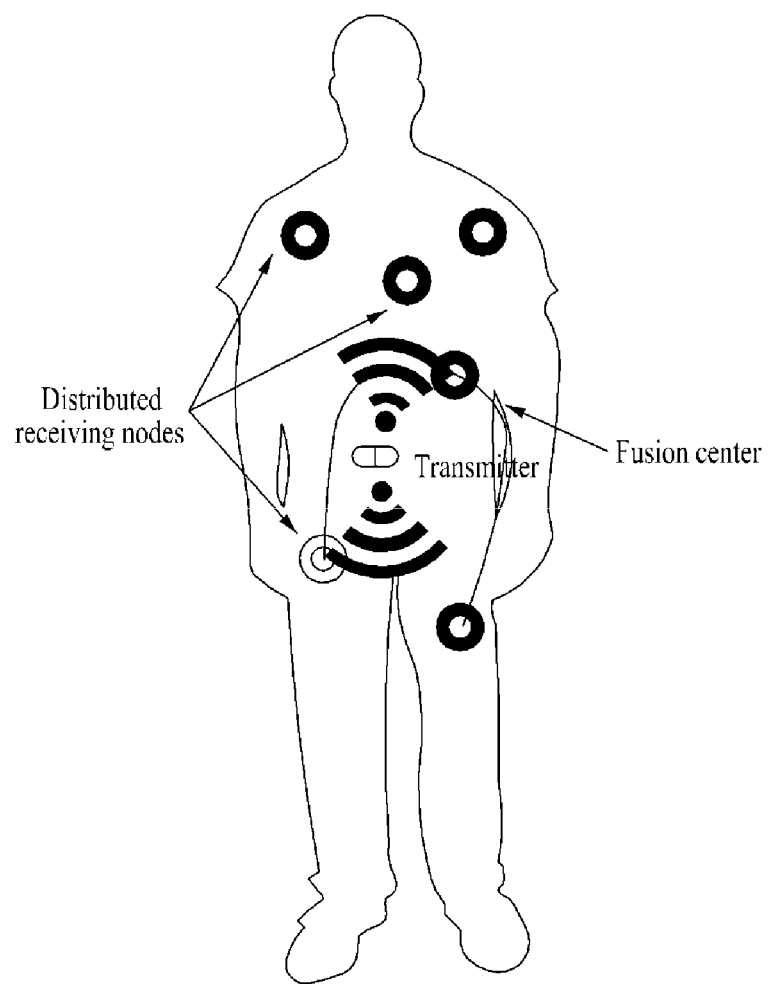
FIG. 1 shows an exemplary diagram of a single-input multiple-output system in a wireless body area communication network.

Advantages and features of the inventive concept and methods for achieving them will be apparent with reference to embodiments described below in detail in conjunction with the accompanying drawings. However, the inventive concept is not limited to the embodiments disclosed below, but can be implemented in various forms, and these embodiments are to make the disclosure of the inventive concept complete, and are provided so that this disclosure will be thorough and complete and will fully convey the scope of the invention to those of ordinary skill in the art, which is to be defined only by the scope of the claims.

The terminology used herein is for the purpose of describing particular embodiments only and is not intended to be limiting of the inventive concept. The singular expressions include plural expressions unless the context clearly dictates otherwise. In this specification, the terms "comprises" and/or "comprising" are intended to specify the presence of stated features, integers, steps, operations, elements, parts or combinations thereof, but do not preclude the presence or addition of steps, operations, elements, parts, or combinations thereof.

Unless defined otherwise, all terms (including technical and scientific terms) used herein have the same meanings as commonly understood by one of ordinary skill in the art to which this invention belongs. Further, unless explicitly defined to the contrary, the terms defined in a generally-used dictionary are not ideally or excessively interpreted.

Hereinafter, preferred embodiments of the inventive concept will be described in detail with reference to the accompanying drawings. The same reference numerals are used for the same components in the drawings, and duplicate descriptions of the same components are omitted.

Embodiments of the inventive concept provides a method for detecting an on-off keying symbol, capable of establishing a distributed reception structure and detecting an on/off keying symbol transmitted through a rapidly changing channel by using probability marginalization and supervised learning in a wireless body area communication network system, thereby reducing a bit error rate of symbol detection and reducing the number of required pilot symbols.

Here, the inventive concept introduces a distributed reception technique to a noncoherence system in which accurate channel information is not available or cannot be obtained in advance in a wireless body area communication network, and provides a robust symbol detection technique in an environment in which a channel gain is not stable, in consideration of a realistic environment in which the human body channel changes rapidly.

For equations disclosed in the inventive concept, $f_{a[n]}(a)$ denotes a probability density function for a random process a[n] according to time "n", "C" denotes a set of complex numbers, |•| denotes the absolute value of a complex number, and $CN(\mu, \sigma^2)$ denotes a complex normal distribution function with mean $\mu$ and variance &.

The inventive concept considers a single-input multiple-output (SIMO) system in a wireless body area communication network as shown in FIG. 1, in which one transmitter and "K" Rx nodes geographically distributed are arranged and all of the Rx nodes are connected to a fusion center to collect information necessary for signal detection. The channel to each transceiver follows different probability density functions because the state of the communicating channel is different depending on the location between the transmitter and each Rx node. In addition, it is assumed that the magnitude of the channel gain varies every time in consideration of the complex structure of the human body and its dynamic changes. For the same reason, a situation in which the transceiver cannot obtain accurate instantaneous and statistical channel state information (CSI) in a manner such as feedback or channel estimation is considered. In such a system, when time is "n", the received signal of the k-th node can be expressed as in Equation 1 below.

$$y_k[n] = \sqrt{P} h_k[n] x[n] + w_k[n] \quad \text{[Equation 1]}$$

Where $x[n] \in \{0, 1\}$ may denote a transmission symbol in an on-off keying scheme, and "P" may denote transmit power. A k-th channel gain $h_k[n] \in C$ may be based on a probability distribution $f_{h_k[n]}(h_k)$ having circularly-symmetric characteristics. It is assumed that the gain of each channel for a certain time of interest considered by the system changes at every instant, but the probability distribution of the channel itself does not change. A noise signal $w_k[n] \in C$ is circularly-symmetric and independent and identically distributed (i.i.d.), and is based on a $CN(0, N_0 B)$ distribution. In this case, $N_0$ and "B" may denote a noise spectral density and a bandwidth, respectively. All channels and noise signals are independent of each other.

A transceiver may have no any channel state information, and a theoretical channel model for an existing wireless body area communication network may be also defined differently for each person or body parts where the transceiver is located.

The inventive concept may provide a symbol detection technique for a certain channel model in consideration of this situation.

Although instantaneous channel information cannot be obtained or utilized, it is still possible to obtain empirical statistical channel information using a pilot signal. A pilot symbol transmitted by a transmitter for a first Np unit time may be expressed as in Equation 2 below.

$$x[n] = \begin{cases} 1, & \text{for } n = 1, 2, \ldots, \frac{N_p}{2} \\ 0, & \text{for } n = \frac{N_p}{2} + 1, \ldots, N_p \end{cases} \quad \text{[Equation 2]}$$

On the other hand, it is assumed that certain on/off keying symbols are transmitted with the same probability in a data transmission operation during a time of $n \geq N_p + 1$.

The inventive concept provides a signal detection technique using the pilot symbol of Equation 2 in an inconsistent wireless body area communication network system in which channel information cannot be used.

Signal Detection Technique Based on Probability Marginalization

The empirical likelihood ratio test (eLRT) technique for empirically calculating the marginal probability by using all values of $N_p$ received pilot signals is a technique having performance close to the performance when statistical channel state information is accurately known in theory. A likelihood function including received pilot signals for each hypothesis that the on-off keying symbol sent by the transmitter is expected to be $x[n]=1$ or $x[n]=0$ when time is $n \geq N_p+1$ may be expressed as in <Equation 3> and <Equation 4> below.

[Equation 3]
$$\mathcal{L}_{eLRT}(x[n] = 1 | y_1[n], \ldots, y_k[n]) = \prod_{k=1}^{K} \frac{2}{N_p} \sum_{m=1}^{N_p/2} \frac{c}{\pi} e^{-c|y_k[n] - y_k[m]|^2}$$

[Equation 4]
$$\mathcal{L}_{eLRT}(x[n] = 0 | y_1[n], \ldots, y_k[n]) = \prod_{k=1}^{K} \frac{2}{N_p} \sum_{m=N_p/2+1}^{N_p} \frac{c}{\pi} e^{-c|y_k[n] - y_k[m]|^2}$$

After substituting signals received by all nodes to the two likelihood functions in the data transmission operation, the symbol for a larger function value among the two likelihood functions may be detected. It has been theoretically proven that, despite the absence of channel state information, when the values of $N_p$ and "c" are very large, an Rx end approaches the symbol detection performance when the Rx end has statistical channel state information. The value of "c" may be appropriately adjusted according to $N_p$, which may increase performance of the data transmission rate of a detector under limited time-frequency resources.

Supervised Learning-Based Signal Detection Technique

Figure 2:
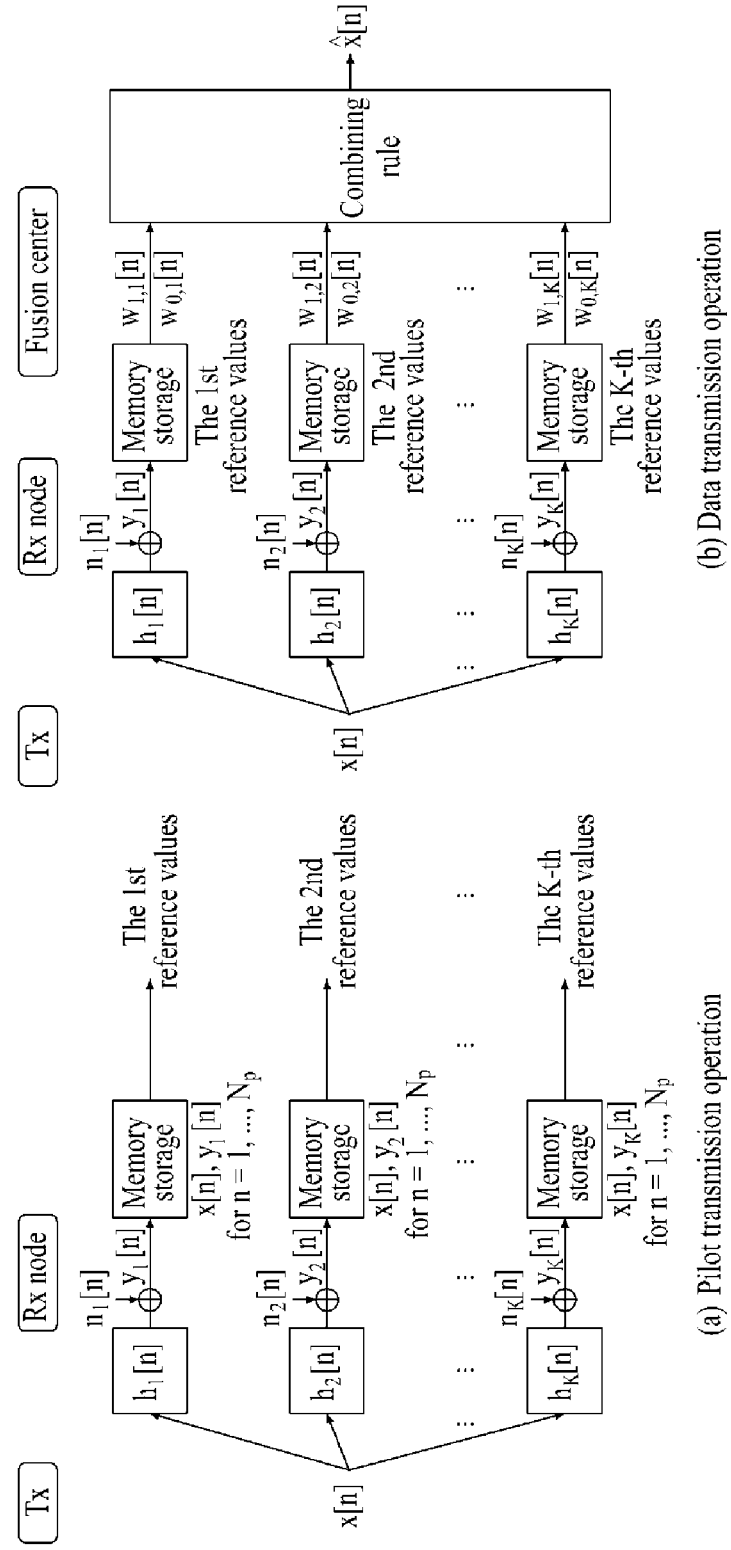
FIG. 2 shows an exemplary diagram of a structure of a supervised learning-based on-off keying signal detection technique.

The overall structure of a weight-combining noncoherent detection (WCNDe) technique that performs detection through supervised learning may be summarized as in FIG. 2 when the communication system is viewed from the perspective of a classification.

As shown in FIG. 2, in the pilot transmission operation, when a transmitter (Tx) transmits a predefined pilot symbol, each distributed node (Rx node) may derive a sample average for 0 and 1 received or a reference value defined as a statistical value such as probability. In the data transmission operation, when a certain on-off keying symbol is transmitted, all distributed nodes may receive the on-off keying symbol and send the on-off keying symbol to a fusion center. The fusion center may combine a received data signal with a reference value at every instant and calculate a weight for each symbol transmission hypothesis of $x[n]=1$ and $x[n]=0$ as in the likelihood functions of Equations 3 and 4 above. Finally, the fusion center may detect the on-off keying symbol by summing the weights calculated for all nodes, and detection of the on-off keying symbol may be performed as shown in Equation 5 below.

$$\hat{x}[n] = \begin{cases} 1, & \text{for } \sum_{k=1}^{K} w_{1,k}[n] - \sum_{k=1}^{K} w_{0,k}[n] > 0 \\ 0, & \text{for } \sum_{k=1}^{K} w_{1,k}[n] - \sum_{k=1}^{K} w_{0,k}[n] < 0 \end{cases} \quad \text{[Equation 5]}$$

where $w_{1,k}[n]$ and $w_{0,k}[n]$ may denote a weight with respect to a k-th node. A detailed detection technique may be designed according to the definition of the reference value and weight.

Hereinafter, probability-WCNDe (p-WCNDe), deviation-WCNDe (d-WCNDe), and combination-WCNDe (c-WCNDe) will be described in detail.

Here, p-WCNDe is a technique that utilizes empirical conditional probability, d-WCNDe is a technique that utilizes deviation between a received data signal and a reference value, and c-WCNDe is a technique that mixes the two techniques of p-WCNDe and d-WCNDe to improve the detection technique. Since the supervised learning-based symbol detection technique has significantly low computational complexity and requires only amplitude information of the received signal, it is possible to design a receiver with a simple structure, thereby reducing cost and power consumption.

Probability-WCNDe (p-WCNDe)

The detection technique is a technique using empirical conditional probability. When a reference value is determined using a received pilot signal and detection is performed based on the reference value, an empirical conditional probability with respect to how well each pilot symbol is detected according to a channel may be obtained. A threshold amplitude serving as one reference value may be expressed as in Equation 6 below.

$$A_{th,k} = \frac{1}{N_p} \sum_{m=1}^{N_p} |y_k[m]| \quad \text{[Equation 6]}$$

After calculating the threshold amplitude for each Rx node, a signal may be detected by comparing a magnitude of a pilot signal with the threshold amplitude again, and the signal may be detected as shown in Equation 7 below.

$$\hat{x}_k[n] = \begin{cases} 1, & \text{for } |y_k[n]| \geq A_{th,k} \\ 0, & \text{for } |y_k[n]| < A_{th,k} \end{cases} \quad \text{[Equation 7]}$$

By counting the number of correctly detected pilot symbols, it may be expressed as in Equations 8 and 9 below.

$$g_{1,k} = \sum_{m=1}^{N_p/2} \delta_{\hat{x}_k[m]x[m]} \quad \text{[Equation 8]}$$

$$g_{0,k} = \sum_{m=N_p/2+1}^{N_p} \delta_{\hat{x}_k[m]x[m]} \quad \text{[Equation 9]}$$

where $\delta_{\hat{x}_k[m],x[m]}$ is a Kronecker delta function, which may be expressed as in Equation 10 below.

$$\delta_{\hat{x}_k[m]x[m]} = \begin{cases} 1, & \text{for } \hat{x}_k[m] = x[m] \\ 0, & \text{for } \hat{x}_k[m] \neq x[m] \end{cases} \quad \text{[Equation 10]}$$

For each of cases of $x[n]=1$ and $x[n]=0$, a reference value called the empirical conditional probability may be defined, and for each of cases of $x[n]=1$ and $x[n]=0$, the empirical conditional probability may be expressed as in Equation 11 and Equation 12 below.

$$P_{(1|1),k} = \begin{cases} \alpha, & \text{for } g_{1,k} < \frac{N_p}{2}\alpha \\ 1-\alpha, & \text{for } g_{1,k} > \frac{N_p}{2}(1-\alpha) \\ g_{1,k}\frac{2}{N_p}, & \text{elsewhere} \end{cases} \quad \text{[Equation 11]}$$

$$P_{(0|0),k} = \begin{cases} \alpha, & \text{for } g_{0,k} < \frac{N_p}{2}\alpha \\ 1-\alpha, & \text{for } g_{0,k} > \frac{N_p}{2}(1-\alpha) \\ g_{0,k}\frac{2}{N_p}, & \text{elsewhere} \end{cases} \quad \text{[Equation 12]}$$

In this case, a parameter $\alpha(0<\alpha<1/2)$ may be appropriately set such that a limit value for the empirical conditional probability is able to be set under assumption that transmission symbol detection cannot actually succeed or fail more than a certain probability.

In the data transmission operation, a certain data symbol is sent and the on-off keying symbol $\hat{x}_k[n]$ may be detected through Equation 7 using the threshold amplitude at each Rx node. The weight used for final symbol detection may be expressed using the empirical conditional probability as in Equation 13 and Equation 14 below.

$$w_{1,k}^p[n] = \begin{cases} \log P_{(1|1),k}, & \text{for } \hat{x}_k[n] = 1 \\ \log(1 - P_{(1|1),k}), & \text{for } \hat{x}_k[n] = 0 \end{cases} \quad \text{[Equation 13]}$$

$$w_{0,k}^p[n] = \begin{cases} \log(1 - P_{(0|0),k}), & \text{for } \hat{x}_k[n] = 1 \\ \log P_{(0|0),k}, & \text{for } \hat{x}_k[n] = 0 \end{cases} \quad \text{[Equation 14]}$$

The fusion center may collect weights of all Rx nodes and finally perform detection of an on-off keying symbol as in Equation 5 above.

Deviation-WCNDe (d-WCNDe)

The detection technique is technique that utilizes a deviation between a received data signal and a reference value, and may compare deviations from magnitudes of received data signals with respect to a reference value for two transmissions of a symbol. In each Rx node, the sample averages of 0 and 1 of the amplitudes of received pilot signals for two symbols are defined as a reference value, and may be expressed as in Equation 15 and Equation 16 below.

$$A_{1,k} = \frac{2}{N_p} \sum_{m=1}^{N_p/2} |y_k[m]| \quad \text{[Equation 15]}$$

$$A_{0,k} = \frac{2}{N_p} \sum_{m=N_p/2+1}^{N_p} |y_k[m]| \quad \text{[Equation 16]}$$

In the data transmission operation, a weight may be calculated using the received data signal and the two sample averages, and the weight may be expressed as in Equation 17 and Equation 18 below.

$$w_{1,k}^d[n] = |y_k[n]| - A_{1,k} \quad \text{[Equation 17]}$$

$$w_{0,k}^d[n] = A_{o,k} - |y_k[n]| \quad \text{[Equation 18]}$$

The fusion center may collect weights of all Rx nodes and finally perform detection of an on-off keying symbol as in Equation 5 above.

Combination-WCNDe (c-WCNDe)

The detection technique is a technique in which p-WCNDe and d-WCNDe are mixed. In a pilot transmission operation, the threshold amplitude, empirical conditional probability, and sample average expressed in p-WCNDe and d-WCNDe using the received pilot signal are all calculated for usage as a reference value for symbol detection. In the data transmission operation, a weight is calculated using the received data signal obtained from each Rx node, and the weight may be expressed as in Equation 19 and Equation 20 below.

$$w_{1,k}^c[n] = \begin{cases} -\frac{\||y_k[n]| - A_{1,k}\|^2}{A_{1,k}} + \frac{1}{A_{th,k}} \log P_{(1|1),k}^{||y_k[n]|-A_{1,k}|^2}, & \text{for } \hat{x}_k[n] = 1 \\ -\frac{\||y_k[n]| - A_{1,k}\|^2}{A_{1,k}} + \frac{1}{A_{th,k}} \log (1 - P_{(1|1),k})^{||y_k[n]|-A_{1,k}|^2}, & \text{for } \hat{x}_k[n] = 0 \end{cases} \quad \text{[Equation 19]}$$

$$w_{0,k}^c[n] = \begin{cases} -\frac{|A_{0,k} - |y_k[n]||^2}{A_{0,k}} + \frac{1}{A_{th,k}} \log (1 - P_{(0|0),k})^{|A_{0,k}-|y_k[n]||^2}, & \text{for } \hat{x}_k[n] = 1 \\ -\frac{|A_{0,k} - |y_k[n]||^2}{A_{0,k}} + \frac{1}{A_{th,k}} \log P_{(0|0),k}^{|A_{0,k}-|y_k[n]||^2}, & \text{for } \hat{x}_k[n] = 0 \end{cases} \quad \text{[Equation 20]}$$

The fusion center may collect weights of all Rx nodes and finally perform detection of an on-off keying symbol as in Equation 5 above.

The performance of the three techniques for detecting an on-off keying symbol according to the inventive concept described above, that is, the p-WCNDe, d-WCNDe and c-WCNDe techniques for detecting an on-off keying symbol can be compared with respect to performance. As a performance index, an uncoded bit error rate may be used, and as shown in FIG. 3, a probabilistic model for the squared value of a channel gain for the wireless body area communication network measured and modeled in the previous study may be used.

It is assumed that the phase of each channel is uniformly distributed in the range of [0, 2π]. When the mean and variance of the probability distribution of the square of an i-th channel gain are $\mu_i$ and $\sigma_i^2$, respectively, in FIG. 3, the coefficient of variation (CV) may be calculated as ad/pi, thus numerically expressing the degree of variation with time of each channel. A noise spectral density and a bandwidth may be set to $N_0$=−174 dBm, B=100 MHz, respectively, and, a noncoherence system may be assumed such that channel distribution between a transmitter and each Rx node does not change during the time of interest and there is no channel state information. For simulation, c=1/($N_0$B) may be used as a parameter value of eLRT, and the number of pilot symbols may be fixed to $N_p$=40 except for FIG. 9. As the boundary parameter used for the empirical conditional probabilities of p-WCNDe and c-WCNDe, α=2/$N_p$ may be used. All of wireless body area communication network channel probability models and values of noise and detector parameters used in c-WCNDe may be specified in usage for clear description, and may be appropriately defined and adjusted according to the situation of the wireless body area communication network model environment considered in the inventive concept.

Figure 4A:
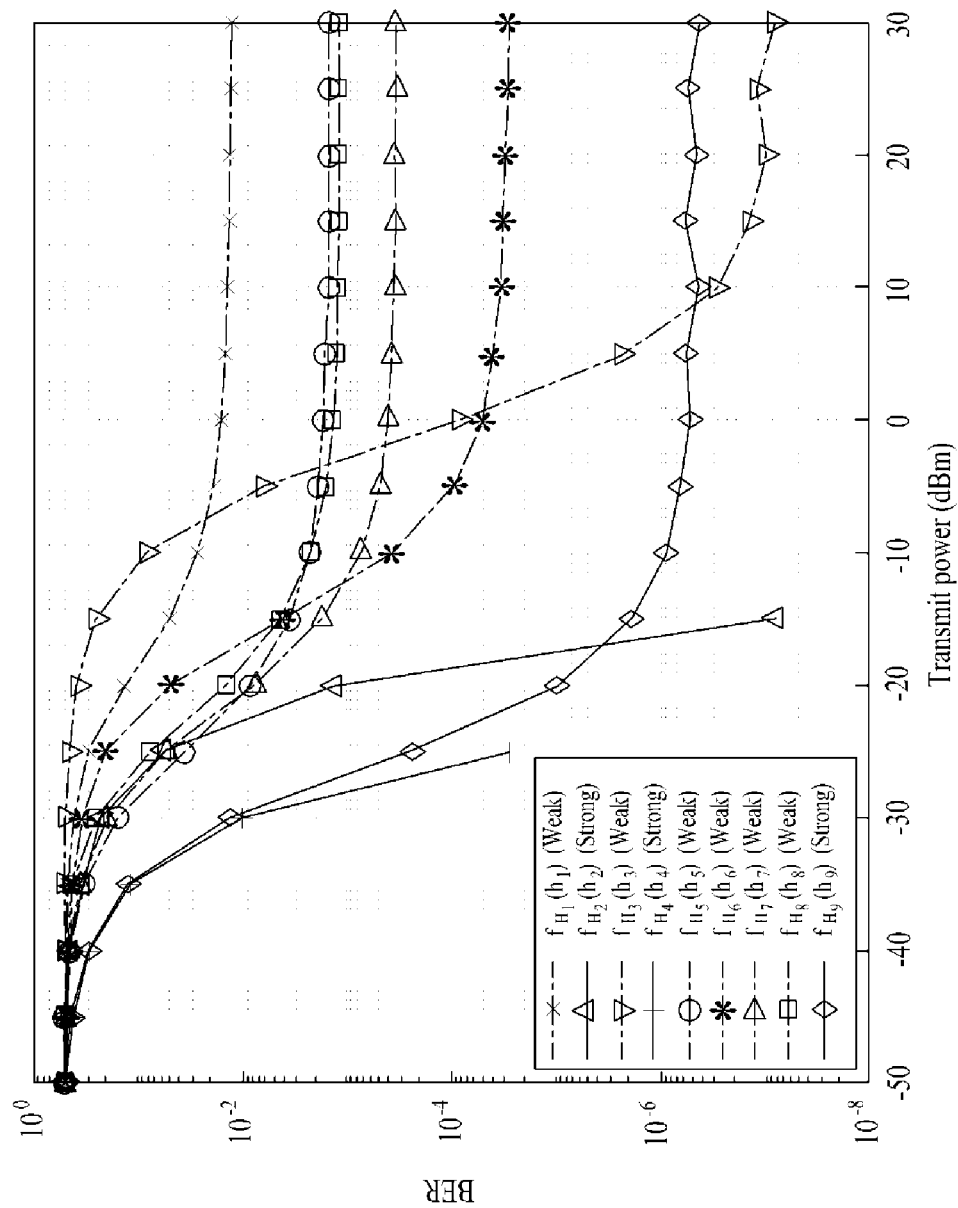
FIG. 4A is a diagram illustrating an example of a bit error rate in the case of using a supervised learning-based symbol detection method of p-WCNDe, when a single Rx node complying with nine different channel distributions is used.
Figure 4B:
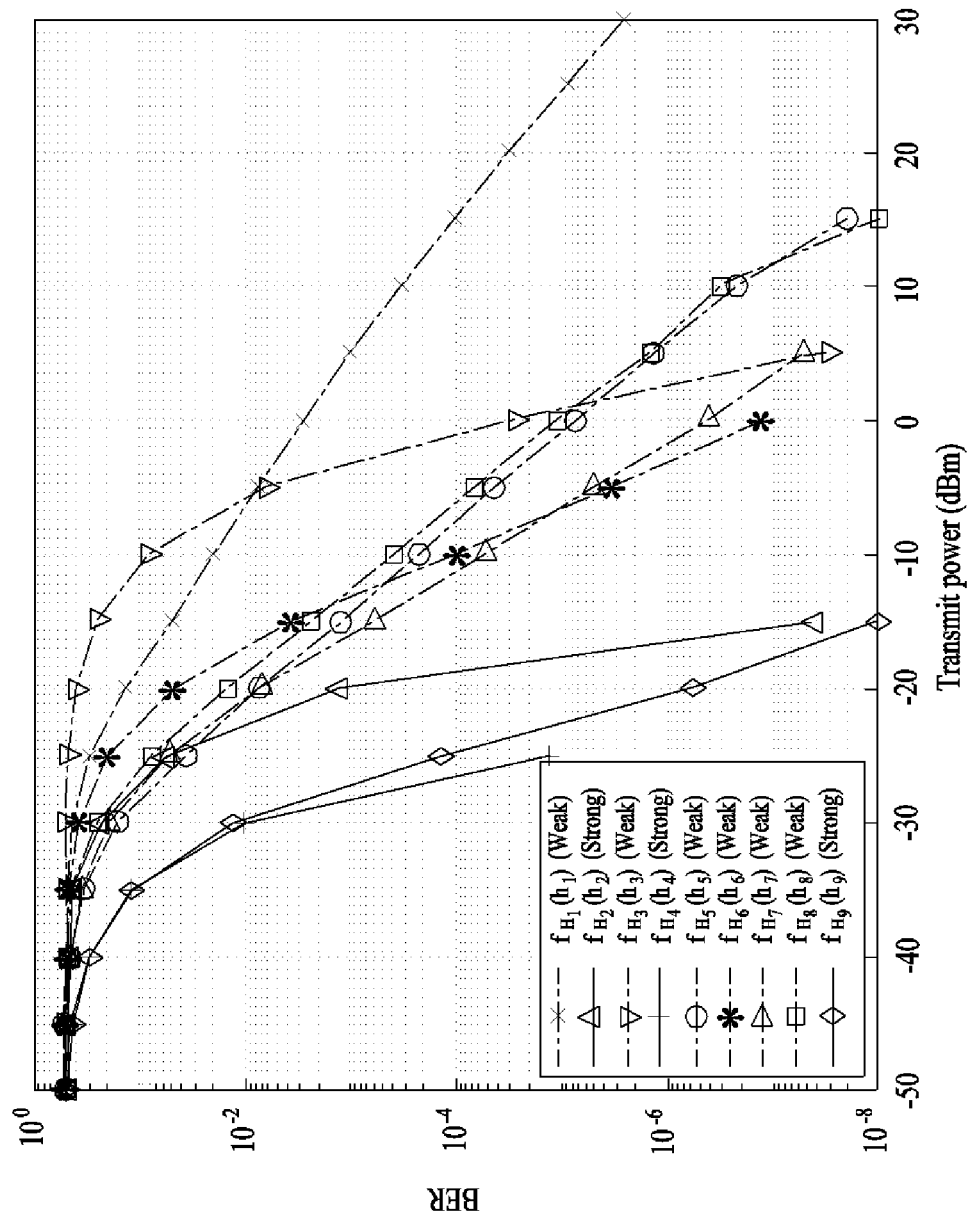
FIG. 4B is a diagram illustrating an example of a bit error rate in the case of a supervised learning-based symbol detection method of c-WCNDe, when a single Rx node complying with nine different channel distributions is used.

FIGS. 4A-B show exemplary diagrams of a bit error rate in the case of using two supervised learning-based symbol detection methods, p-WCNDe and c-WCNDe, when using a single Rx node complying with 9 different channel distributions. FIG. 4A shows a bit error rate when using the p-WCNDe supervised learning-based symbol detection method, and FIG. 4B shows a bit error rate when the c-WCNDe supervised learning-based symbol detection method is used.

As can be seen from FIGS. 4A-B, it can be seen that both supervised learning-based symbol detection methods (p-WCNDe, c-WCNDe) have more improved performance as transmit power increases. In particular, it can be seen that c-WCNDe overcomes the environment in which channel changes every moment and does not show an error floor phenomenon.

Figure 5:
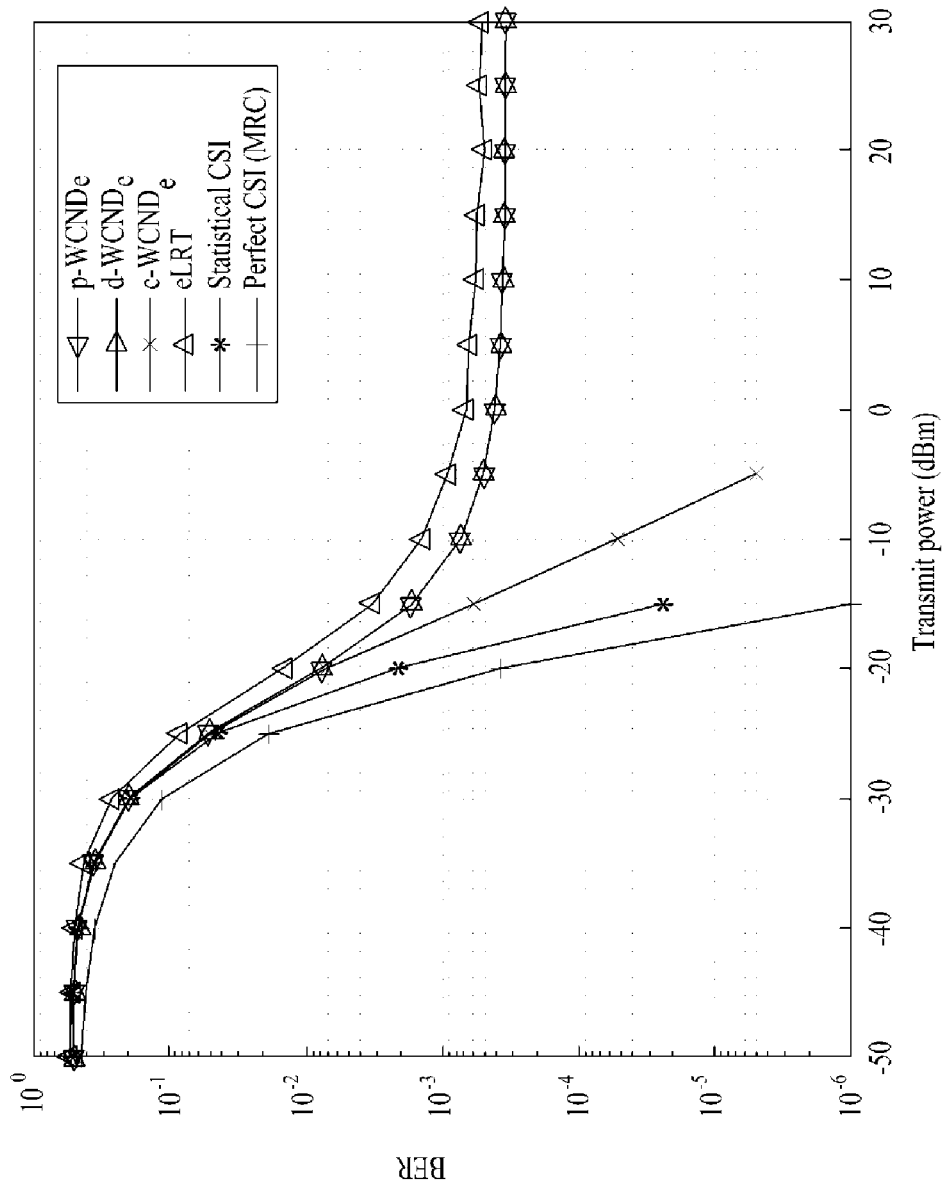
FIG. 5 shows an exemplary diagram for comparing bit error rates for various detection techniques according to the presence or absence of channel state information when a single node following the channel distribution of FIG. 3 is used.

FIG. 5 shows an exemplary diagram for comparing bit error rates for various detection techniques according to the presence or absence of channel state information when a single node following the channel distribution of FIG. 3 is used.

It can be seen from FIG. 5 that, in the case of eLRT, the performance is improved to some extent according to an increase in transmit power, even when a small number of pilot symbols are used, and in the case of c-WCNDe, performance of the detection techniques (statistical CSI, perfect CSI) when the Rx end knows the statistical and instantaneous channel state information is consistently followed. There is no error floor even when high transmit power is used.

Figure 6A:
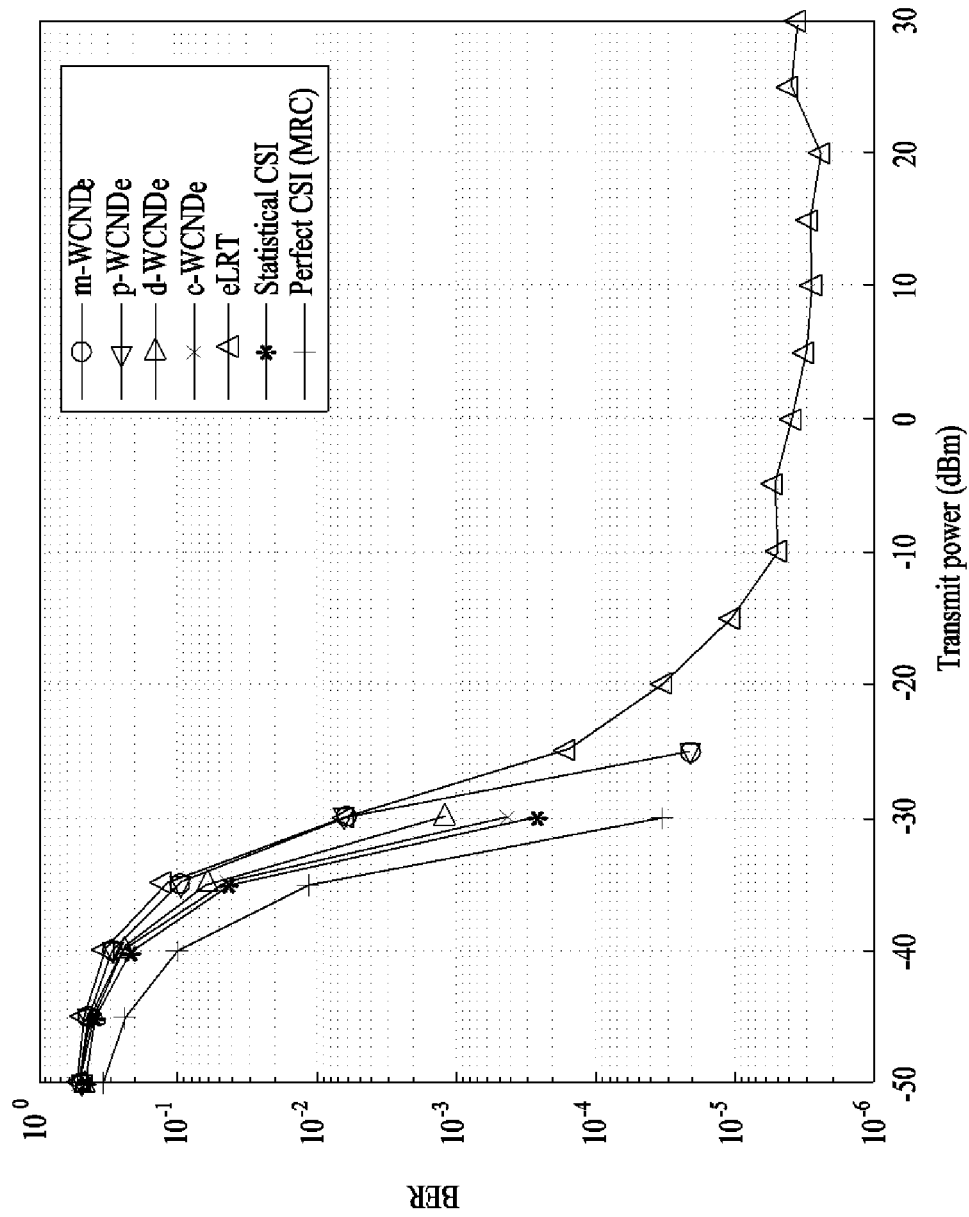
FIG. 6A is an exemplary diagram illustrating bit error rates of multiple Rx nodes using three channels of the strong channel group in the solid line shown in FIGS. 4A-4B.
Figure 6B:
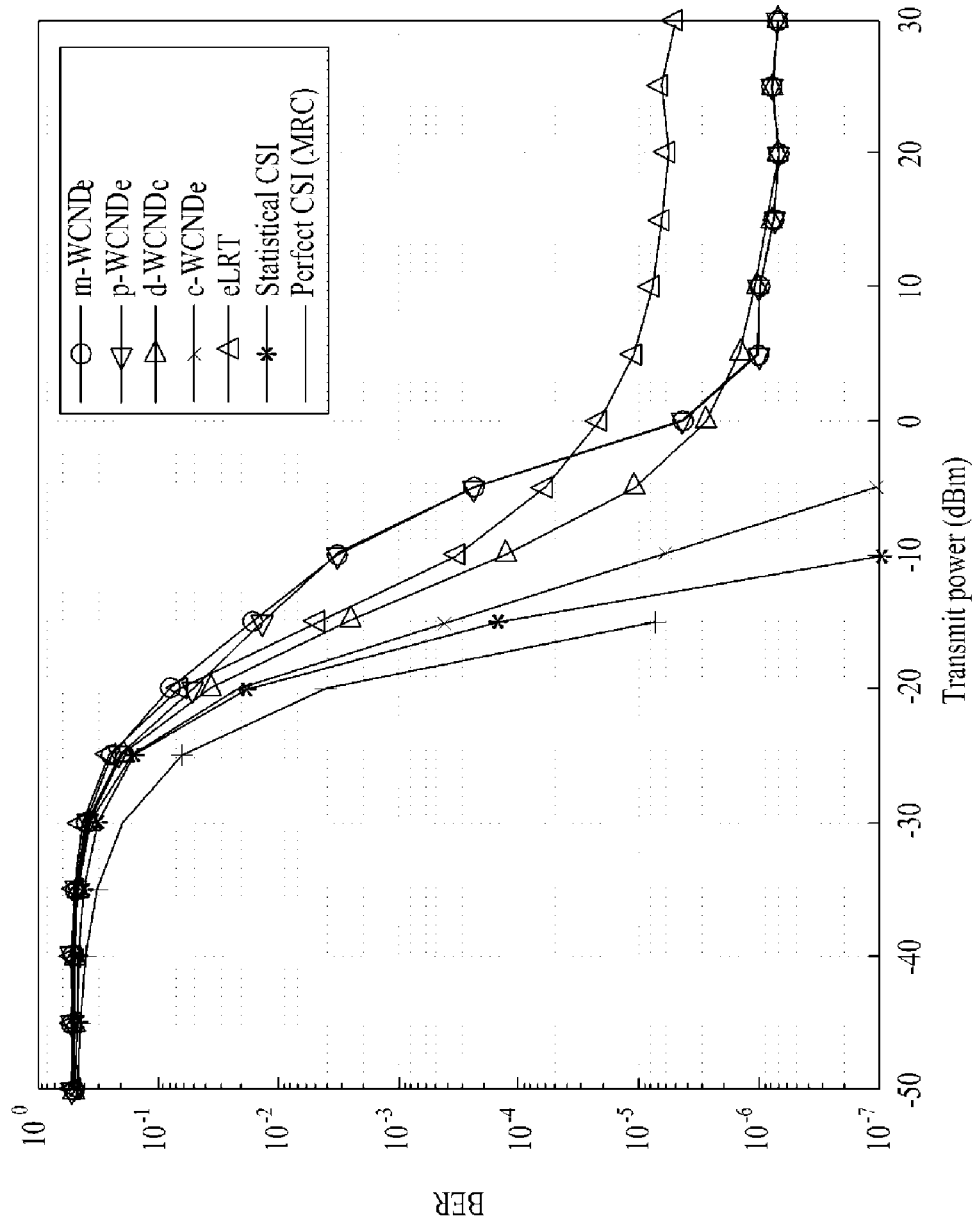
FIG. 6B is an exemplary diagram illustrating bit error rates of multiple Rx nodes using six channels of the weak channel group in the dash-dot line of FIGS. 4A-B.

FIGS. 6A-B are exemplary diagrams showing bit error rates of multiple Rx nodes using channels of each group when nine channels of FIG. 3 are classified into a strong channel group and a weak channel group. FIG. 6A shows an exemplary diagram for bit error rates of multiple Rx nodes using three channels of the strong channel group in the solid line shown in FIGS. 4A-B, and FIG. 6B shows an exemplary diagram for bit error rates of multiple Rx nodes using six channels of the weak channel group in the dash-dot line shown in FIGS. 4A-B.

It can be seen from FIGS. 6A-B that the c-WCNDe of the supervised learning method among the detection methods shows excellent performance when using multiple Rx nodes, and has performance almost close to the performance when the statistical channel state information is accurately known.

Figure 7:
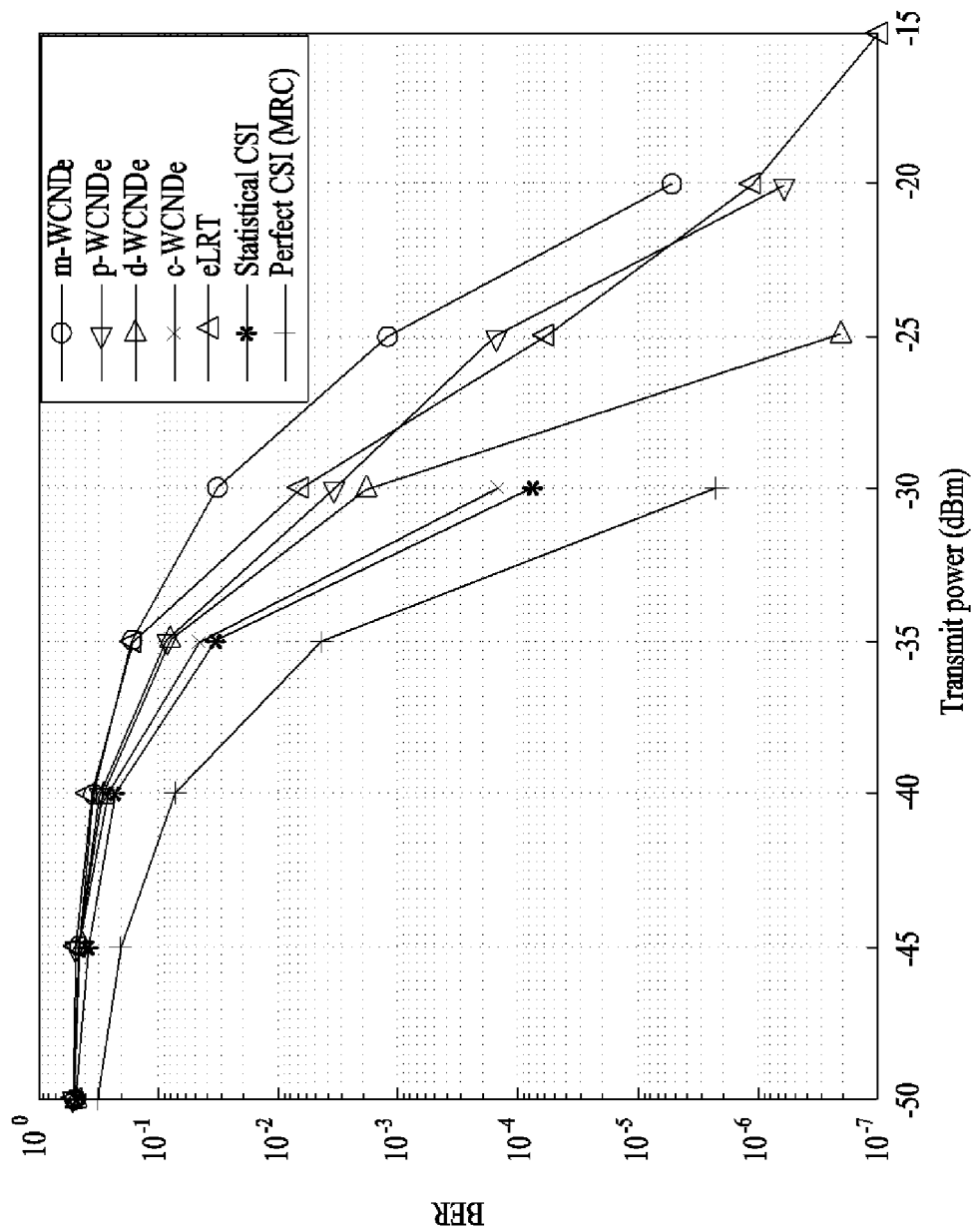
FIG. 7 is an exemplary diagram illustrating bit error rates when all nine channels are used in multiple Rx nodes.

FIG. 7 shows an exemplary diagram of a bit error rate when nine channels are all used in multiple Rx nodes, and shows the performance of the coherence and noncoherence detection technique when all of nine channels of FIG. 3 are used.

It can be seen from FIG. 7 that, all noncoherence detection techniques satisfy the bit error rate of a level evaluated as stable performance even in a coherent communication system, and the eLRT has performance which steadily increases as the number of Rx nodes increases as compared with FIG. 5 and when a larger number of pilot symbols can be transmitted, better performance is shown according to the model characteristics of the wireless body area communication network channel.

Figure 8:
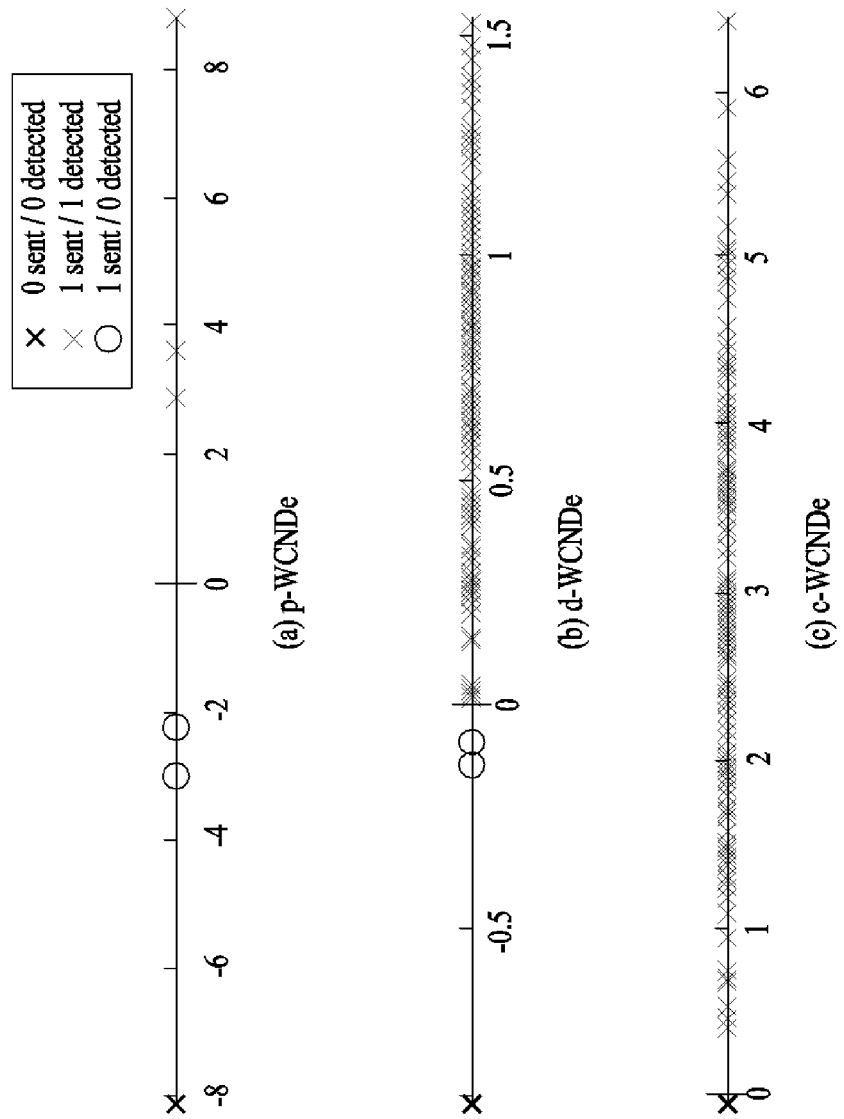
FIG. 8 shows an exemplary diagram for distribution of values obtained by normalizing a weight difference between two weights, derived through a received data signal in three supervised learning-based symbol detection techniques.

FIG. 8 shows an exemplary diagram for distribution of values obtained by normalizing a difference between two weights, derived through a received data signal in three supervised learning-based symbol detection techniques, in which the distribution thereof is shown by normalizing the values of $\Sigma_{k=1}^{K} w_{1,k}[n] - \Sigma_{k=1}^{K} w_{0,k}[n]$ that is the difference between two weights. Here, FIG. 8 uses three channels of first, fifth and eighth channels in FIG. 3, and transmit power is 40 dBm, in which there is little influence of a noise signal.

As can be seen from FIG. 8, circle shows an error occurrence case in which 0 is detected when 1 is transmitted. It can be seen from FIG. 8 that the frequency of error occurrence can be reduced as a larger number of multiple Rx nodes are used, and almost no errors occur in c-WCNDe.

Figure 9:
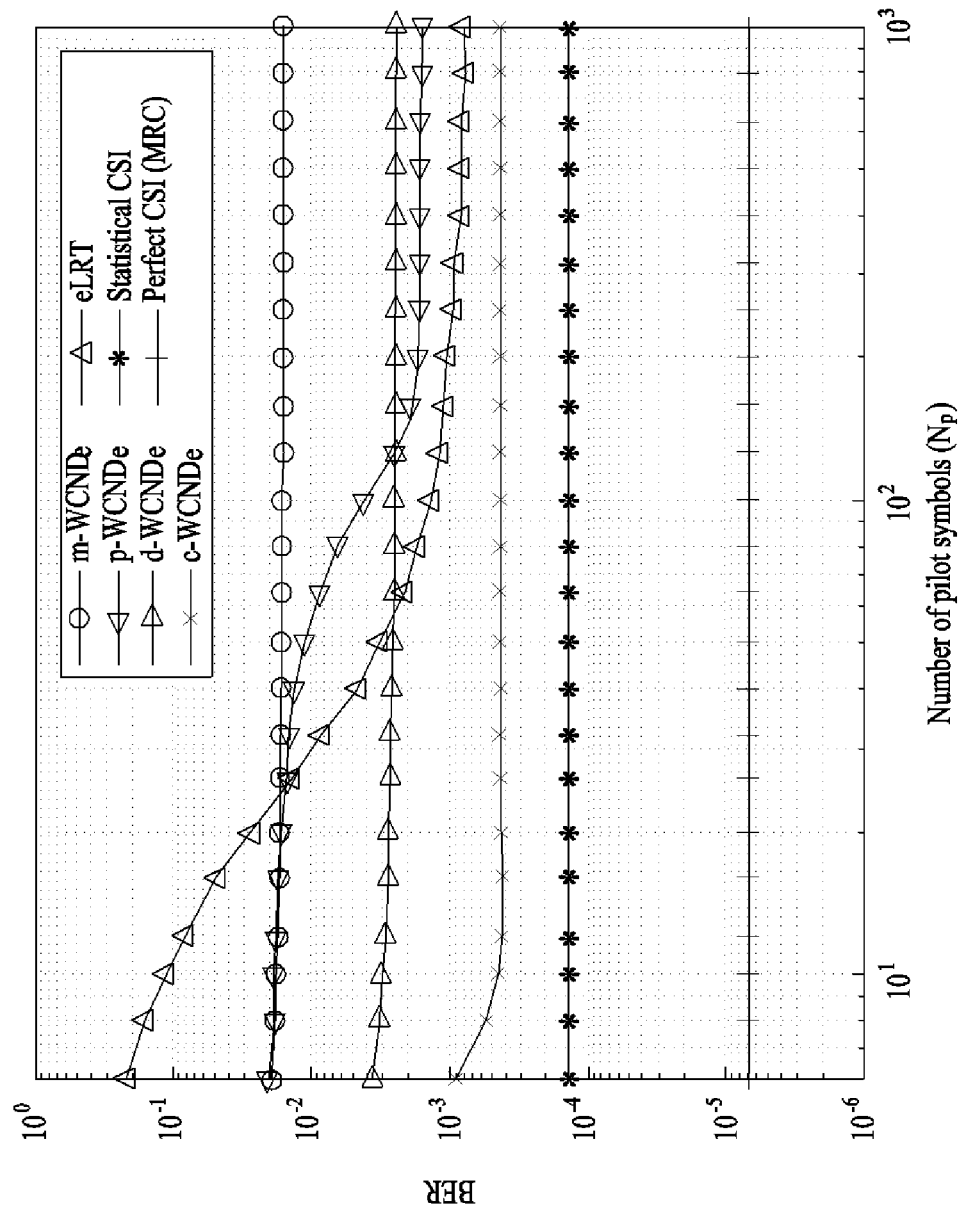
FIG. 9 is an exemplary diagram illustrating bit error rates when the number of transmitted pilot symbols is changed from 6 to 1000 when a weak channel group is used as multiple Rx nodes.

FIG. 9 shows an exemplary diagram for the bit error rate when the number of transmit pilot symbols is changed from 6 to 1000 when a weak channel group is used as multiple Rx nodes, and shows bit error rates of several symbol detection techniques when the number of transmit pilot symbols is changed in a case where three channels of the weak channel group, for example, the first, third and sixth channels are used. Here, the transmit power may be fixed to 15 dBm.

As can be seen from FIG. 9, most detection techniques can use a reference value by converging the reference value to the average of the corresponding random variables even though a small number of pilot symbols are used. The eLRT may adjust the parameter value to approximate the performance when statistical channel state information is known.

As described above, the method according to the embodiments of the inventive concept detects an on-off keying symbol transmitted through a rapidly changing channel in a noncoherence wireless body area communication network system using supervised learning, thereby lowering the bit error rate of symbol detection and thus reducing the number of required pilot symbols.

In addition, the method according to the embodiments of the inventive concept can secure the stability of signal reception by using various channel models through a distributed reception technique that guarantees low cost and low power consumption by assuming a noncoherence system of the wireless body area communication network.

In addition, the method according to the embodiments of the inventive concept can exhibit robust performance against noise and a wireless body area communication network channel continuously changing depending on a method for designing a reference value and a weight.

This method of the inventive concept can implement an on-off keying symbol detection system using the distributed Rx nodes and a fusion center constituting the wireless body area communication network shown in FIG. 1.

For example, according to an embodiment, a system for detecting on-off keying symbols in a wireless body area communication network may include distributed Rx nodes and a fusion center, wherein each of the Rx nodes may receive a pilot signal for a pilot symbol transmitted from a transmitter, obtain a reference value using the received pilot signal, transmit the received data signal to a fusion center when the data signal for the on-off keying symbol transmitted from the transmitter is received by each of the Rx nodes, and the fusion center may calculate a weight of the on-off keying symbol for each of the Rx nodes using the reference value obtained by each of the Rx nodes and the received data signal and detect the on-off keying symbol transmitted from the transmitter using the weight of the on-off keying symbol calculated for each of the Rx nodes.

Each of the Rx nodes may obtain the reference value using a sample average or probability of 0 and 1 of the received pilot signal as a statistical value, and the fusion center may sum a weight of on-off keying symbols of 1 and a weight of on-off keying symbols of 0, calculated for each of the Rx nodes, and detect the on-off keying symbol transmitted from the transmitter based on a difference between the summed weight of the on-off keying symbols of 1 and the summed weight of the on-off keying symbols of 0.

Further, each of the Rx nodes may calculate a threshold amplitude, compare the calculated threshold amplitude with a magnitude of the received pilot signal to detect pilot symbols for 0 and 1, and obtain an empirical conditional probability for detection of the pilot symbols for 0 and 1 as the reference value, and the fusion center may calculate a weight of the on-off keying symbol for each of the Rx nodes using detected on-off keying symbols for 0 and 1 through comparison between the empirical conditional probability for detection of the pilot symbols for 0 and 1 and the calculated threshold amplitude, when each of the Rx nodes detects on-off keying symbols for 0 and 1 by comparing the calculated threshold amplitude with a magnitude of the received data signal.

Further, each of the Rx nodes may obtain a sample average for 0 and 1 of the received pilot signal as the reference value, and the fusion center may calculate a weight of the on-off keying symbol for each of the Rx nodes by using a difference between the obtained reference value for the pilot symbol for 0 and 1 and the magnitude of the received data signal.

Further, each of the Rx nodes may calculate a threshold amplitude, comparing the calculated threshold amplitude with a magnitude of the received pilot signal to detect pilot symbols for 0 and 1, calculate a sample average for 0 and 1 of the received pilot signal, and obtain both the calculated sample average and an empirical conditional probability for detection of a pilot symbol for 0 and 1 as the reference value, and the fusion center may calculate a weight of the on-off keying symbol for each of the Rx nodes using detected on-off keying symbols for 0 and 1 through comparison among the empirical conditional probability for detection of the pilot symbols for 0 and 1, the calculated sample average and the calculated threshold amplitude, when each of the Rx nodes detects on-off keying symbols for 0 and 1 by comparing the calculated threshold amplitude with a magnitude of the received data signal.

Although the description of the system is omitted, each component of the system may include all the contents described with reference to FIGS. 1 to 9, which will be apparent to those skilled in the art.

The apparatus described herein may be implemented with hardware components and software components and/or a combination of the hardware components and the software components. For example, the apparatus and components described in the embodiments may be implemented using one or more general-purpose or special purpose computers, such as, for example, a processor, a controller, an arithmetic logic unit (ALU), a digital signal processor, a microcomputer, a field programmable array (FPA), a programmable logic unit (PLU), a microprocessor or any other device capable of executing and responding to instructions. The processing device may run an operating system (OS) and one or more software applications that run on the OS. The processing device also may access, store, manipulate, process, and create data in response to execution of the software. For convenience of understanding, one processing device is described as being used, but those skilled in the art will appreciate that the processing device includes a plurality of processing elements and/or multiple types of processing elements. For example, the processing device may include multiple processors or a single processor and a single controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described methods may be embodied in the form of program instructions that can be executed by various computer means and recorded on a computer-readable medium. The computer readable medium may include program instructions, data files, data structures, and the like, alone or in combination. Program instructions recorded on the media may be those specially designed and constructed for the purposes of the inventive concept, or they may be of the kind well-known and available to those having skill in the computer software arts. Examples of computer readable recording media include magnetic media such as hard disks, floppy disks and magnetic tape, optical media such as CD-ROMs, DVDs, and magneto-optical media such as floppy disks, and hardware devices specifically configured to store and execute program instructions, such as ROM, RAM, flash memory, and the like. Examples of program instructions include not only machine code generated by a compiler, but also high-level language code that can be executed by a computer using an interpreter or the like.

Although the embodiments have been described by the limited embodiments and the drawings as described above, various modifications and variations are possible to those skilled in the art from the above description. For example, even though the described techniques may be performed in a different order from the described method, and/or components of the described systems, structures, devices, circuits, etc. may be combined or combined in a different form from the described method, or other components, or even when replaced or substituted by equivalents, an appropriate result can be achieved.

Therefore, other implementations, other embodiments, and equivalents to the claims are within the scope of the following claims.

According to the embodiments of the inventive concept, it is possible to reduce a bit error rate of symbol detection and reduce the number of required pilot symbols by detecting on/off keying symbols transmitted through a rapidly changing channel in a noncoherence wireless body area communication network using supervised learning.

Specifically, the inventive concept establishes a distributed reception structure and utilizes probability marginalization and supervised learning to detect on-off keying symbols transmitted through a rapidly changing channel in a wireless body area communication network system.

According to an embodiment of the inventive concept, it is possible to increase the accuracy of body condition measurement and the reliability of disease diagnosis to improve the quality of medical care by accurately detecting an on-off keying symbol transmitted through a rapidly changing channel in a wireless body area communication network system.

The inventive concept may be applied to fields that use devices that respond to physical conditions or activities and the field of medical devices that judge health status through physical measurements and complete medical examination as well as non-medical devices and sensor development-related fields capable of detecting and quantifying physical activity to provide a result of quantification with software such as games and smartphone applications.

The simplification of the structure of a receiving device, which is one of the advantages of distributed reception used in the inventive concept also increases the universality of measurement, thus making it possible that the diagnosis of the physical condition can be made at a place outside the medical institution and the fatal deterioration of the patient's physical condition can be detected and dealt with in advance. In addition, the inventive concept can be utilized in a wide range of fields, such as indirectly performing dangerous tasks which require human precision in various non-medical fields or performing additional application functions through physical activity.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for detecting an on-off keying symbol in a wireless body area communication network, the method comprising:
   receiving, by each of distributed Rx nodes, a pilot signal for a pilot symbol transmitted from a transmitter, the distributed Rx nodes constituting the wireless body area communication network;
   obtaining, by each of the Rx nodes, a reference value using the received pilot signal;
   transmitting, by each of the Rx nodes, a data signal for the on-off keying symbol transmitted from the transmitter to a fusion center when the data signal is received by each of the Rx nodes;
   calculating, by the fusion center, a weight of the on-off keying symbol for each of the Rx nodes using the reference value obtained from each of the Rx nodes and the received data signal; and
   detecting, by the fusion center, the on-off keying symbol transmitted from the transmitter using the weight of the on-off keying symbol calculated for each of the Rx nodes.

2. The method of claim 1, wherein the obtaining of the reference value includes obtaining, by each of the Rx nodes, the reference value using a sample average or probability of 0 and 1 of the received pilot signal as a statistical value.

3. The method of claim 1, wherein the detecting of the on-off keying symbol includes summing a weight of on-off keying symbols of 1 and a weight of on-off keying symbols of 0, calculated for each of the Rx nodes, and detecting the on-off keying symbol transmitted from the transmitter based on a difference between the summed weight of the on-off keying symbols of 1 and the summed weight of the on-off keying symbols of 0.

4. The method of claim 1, wherein the obtaining of the reference value includes calculating, by each of the Rx nodes, a threshold amplitude, comparing the calculated threshold amplitude with a magnitude of the received pilot signal to detect pilot symbols for 0 and 1, and obtaining an empirical conditional probability for detection of the pilot symbols for 0 and 1 as the reference value, and
   wherein the calculating of the weight of the on-off keying symbol includes calculating a weight of the on-off keying symbol for each of the Rx nodes using detected on-off keying symbols for 0 and 1 through comparison between the empirical conditional probability for detection of the pilot symbols for 0 and 1 and the calculated threshold amplitude, when each of the Rx nodes detects on-off keying symbols for 0 and 1 by comparing the calculated threshold amplitude with a magnitude of the received data signal.

5. The method of claim 1, wherein the obtaining of the reference value includes obtaining, each of the Rx nodes, a sample average for 0 and 1 of the received pilot signal, as the reference value, and
   wherein the calculating of the weight of the on-off keying symbol includes calculating a weight of the on-off keying symbol for each of the Rx nodes by using a difference between the reference value for the pilot symbol for 0 and 1 obtained by each of the Rx nodes and a magnitude of the received data signal.

6. The method of claim 1, wherein the obtaining of the reference value includes calculating, by each of the Rx nodes, a threshold amplitude, comparing the calculated threshold amplitude with a magnitude of the received pilot signal to detect pilot symbols for 0 and 1, calculating a sample average for 0 and 1 of the received pilot signal, and obtaining both the calculated sample average and an empirical conditional probability for detection of a pilot symbol for 0 and 1 as the reference value, and
   wherein the calculating of the weight of the on-off keying symbol includes calculating a weight of the on-off keying symbol for each of the Rx nodes using detected on-off keying symbols for 0 and 1 through comparison among the empirical conditional probability for detection of the pilot symbols for 0 and 1, the calculated sample average and the calculated threshold amplitude, when each of the Rx nodes detects on-off keying symbols for 0 and 1 by comparing the calculated threshold amplitude with a magnitude of the received data signal.

7. A system for detecting an on-off keying symbol in a wireless body area communication network, the system comprising:
   distributed Rx nodes; and
   a fusion center,
   wherein each of the Rx nodes is configured to receive a pilot signal for a pilot symbol transmitted from a transmitter, obtain a reference value using the received pilot signal, transmit the received data signal to a fusion center when the data signal for the on-off keying symbol transmitted from the transmitter is received by each of the Rx nodes, and
   wherein the fusion center is configured to calculate a weight of the on-off keying symbol for each of the Rx nodes using the reference value obtained from each of the Rx nodes and the received data signal and detect the on-off keying symbol transmitted from the transmitter using the weight of the on-off keying symbol calculated for each of the Rx nodes.

8. The system of claim 7, wherein each of the Rx nodes is configured to obtain the reference value using a sample average or probability of 0 and 1 of the received pilot signal as a statistical value.

9. The system of claim 7, wherein the fusion center is configured to sum a weight of on-off keying symbols of 1 and a weight of on-off keying symbols of 0, calculated for each of the Rx nodes, and detect the on-off keying symbol transmitted from the transmitter based on a difference between the summed weight of the on-off keying symbols of 1 and the summed weight of the on-off keying symbols of 0.

10. The system of claim 7, wherein each of the Rx nodes is configured to calculate a threshold amplitude, compare the calculated threshold amplitude with a magnitude of the received pilot signal to detect pilot symbols for 0 and 1, and obtain an empirical conditional probability for detection of the pilot symbols for 0 and 1 as the reference value, and
   wherein the fusion center is configured to calculate a weight of the on-off keying symbol for each of the Rx nodes using detected on-off keying symbols for 0 and 1 through comparison between the empirical conditional probability for detection of the pilot symbols for 0 and 1 and the calculated threshold amplitude, when each of the Rx nodes detects on-off keying symbols for 0 and 1 by comparing the calculated threshold amplitude with a magnitude of the received data signal.

11. The system of claim 7, wherein each of the Rx nodes is configured to obtain a sample average for 0 and 1 of the received pilot signal as the reference value, and wherein the fusion center is configured to calculate a weight of the on-off keying symbol for each of the Rx nodes by using a difference between the reference value for the pilot symbol for 0 and 1 obtained by each of the Rx nodes and a magnitude of the received data signal.

12. The system of claim 7, wherein each of the Rx nodes is configured to calculate a threshold amplitude, comparing the calculated threshold amplitude with a magnitude of the received pilot signal to detect pilot symbols for 0 and 1, calculate a sample average for 0 and 1 of the received pilot signal, and obtain both the calculated sample average and an empirical conditional probability for detection of a pilot symbol for 0 and 1 as the reference value, and wherein the fusion center is configured to calculate a weight of the on-off keying symbol for each of the Rx nodes using detected on-off keying symbols for 0 and 1 through comparison among the empirical conditional probability for detection of the pilot symbols for 0 and 1, the calculated sample average and the calculated threshold amplitude, when each of the Rx nodes detects on-off keying symbols for 0 and 1 by comparing the calculated threshold amplitude with a magnitude of the received data signal.

* * * * *